April 28, 1942.    W. VAN B. ROBERTS    2,280,978
NEGATIVE TRANSCONDUCTANCE DEVICE
Filed Dec. 20, 1939
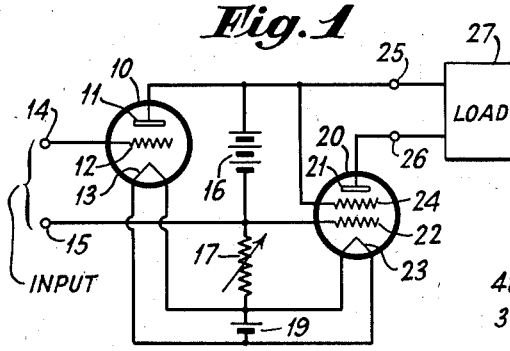
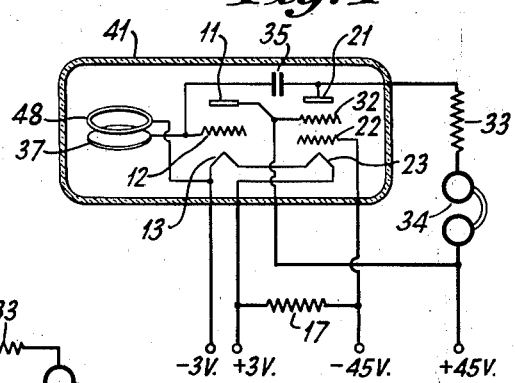
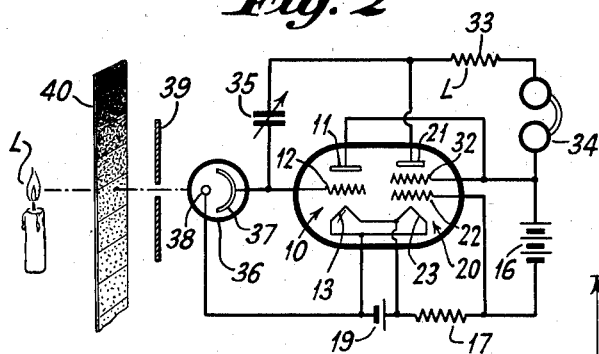
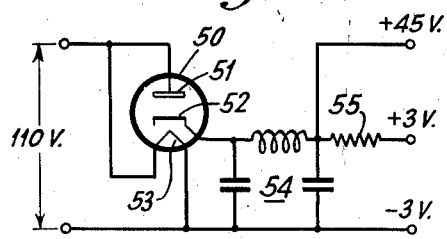
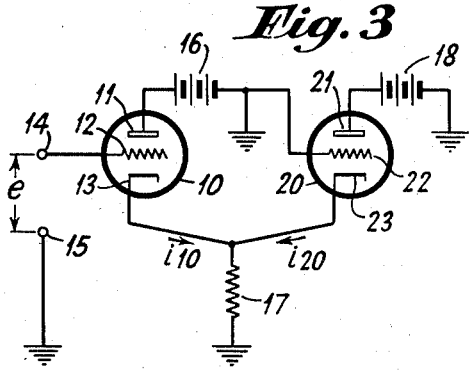
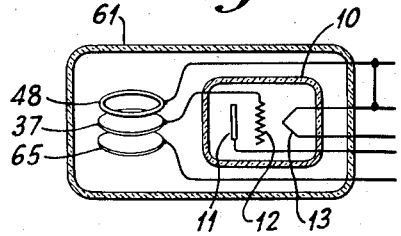
INVENTOR.
WALTER VAN B. ROBERTS
BY
ATTORNEY.

Patented Apr. 28, 1942

2,280,978

UNITED STATES PATENT OFFICE 2,280,978

NEGATIVE TRANSCONDUCTANCE DEVICE

Walter van B. Roberts, Princeton, N. J., assignor to Radio Corporation of America, a corporation of Delaware Application December 20, 1939, Serial No. 310,115

9 Claims. (Cl. 250—41.5)

The present invention relates to means for producing negative transconductance generally and, in particular, to the production of relaxation oscillations.

An object of the present invention is to provide an arrangement comprising a plurality of electron discharge devices adapted to have their cathodes energized from a single source of voltage and their anode circuits energized from a single source of anode potential, said arrangement having a pair of input terminals and a pair of output terminals between which a negative transconductance exists that is substantially independent of frequency.

A further object of the present invention is to provide, by the use of such an arrangement, a relaxation oscillator whose frequency depends upon the capacity of a single condenser and not on a plurality of condensers.

Figure 1 shows a transconductance arrangement in accordance with the invention.

Figure 2 shows the transconductance device of Figure 1 connected to produce relaxation oscillations and, in particular, to provide a photoelectric measuring device.

Figure 3 is a schematic simplified circuit which is given for the purpose of facilitating the analysis of the operation of the preceding figures.

Figure 4 shows a modification of the photoelectric measuring device of Figure 3 so arranged as to include in one evacuated envelope all leakage paths which influence the frequency of the relaxation oscillations.

Figure 5 shows a power supply circuit for operating the arrangement of Figure 4 from an alternating current source.

Figure 6 shows a modification of a portion of Figure 4 wherein separated evacuated envelopes are employed.

Referring, first, to Figure 3 it may be shown that a voltage $e$ applied between input terminals 14, 15 causes an increment $I_{20}$ of the space current of tube 20 which is proportional to $e$ but which has a direction opposite to that which it would have if the voltage $e$ had been impressed directly in the input circuit of tube 20. Hence, the arrangement schematically shown in Figure 3 provides a negative transconductance between input terminals 14, 15 and the anode cathode circuit of tube 20. Its negative transconductance does not depend upon frequency since there are no reactance elements in the system, and for large values of resistance 17 the transconductance is relatively little dependent upon the magnitude of resistance 17. In the prior art negative transconductances independent of frequency have been obtained in circuits employing a pair of conventionally operated electron discharge devices only by providing separate sources of anode potential or separate cathode heating sources, whereas it will be evident, from inspection of Figure 3, that a common anode battery and a common cathode heating supply may be used. Separate batteries 16 and 18 have been indicated only to facilitate the reading of the diagram.

Referring now to Figure 1, assume that the output terminals 25, 26 are shorted together. Then screen 24 and plate 21 may be considered as a single electrode system and the total current to this system is given by the equation:

$$i_{20} = \frac{g_1 c_2}{S + C_1 + C_2} e$$

wherein $i_{20}$ is the space current of tube 20, $g_1$ is the transconductance of tube 10, $S$ is the conductance of resistor 17 and $C_1$ and $C_2$ represent respectively the changes in space current in the tubes 10 and 20 per volt change in the cathode potentials of these tubes. Since a voltage applied in the cathode circuit of a tube is applied both in the cathode grid circuit and, also, in the cathode plate circuit, it will be seen that $C_1$ is equal to the transconductance $g_1$ multiplied by the quantity $m+1$ where $m$ is the amplification constant of tube 10. A similar statement applies to the quantity $C_2$ where screen 24 and plate 21 are connected together so that the tube acts like a triode.

If screen 24 substantially shields grid 22 from an influence of variations in the potential of plate 21 the current drawn by the combination of these two electrodes will be substantially unaltered by the connection of a load 27 in the plate circuit. Furthermore, as is well known, unless the voltage drop through this load is so great as to reduce the potential of plate 21 to a value small compared with that of screen 24, the plate will receive a large proportion of the aforesaid total current. Thus, it is seen that the transconductance between input terminals 14 and 15 and the terminals 25, 26 will be only slightly less in magnitude than indicated by the above equation which gave implicitly the transconductance between terminals 14, 15 and the return circuit from the junction of screen 24 and plate 21. It should be noted that while a screen grid tube has been shown at 20 and is preferred, it is also possible to practice the invention with a triode at this position.

In Figure 2 there is shown a circuit for measuring light intensity which employs the arrangement of Figure 1 for the production of negative transconductance and, in addition, a condenser 35 coupling anode 21 to grid 12 and a photocell 36 connected to act as a grid leak between grid 12 and a point in the cathode circuit of the system. There is also employed as load circuit (corresponding to element 27 of Figure 1) a resistance 33 for developing the voltage to be fed back through condenser 35 to grid 12 and a pair of phones or loudspeaker 34 in series with resistance 33 for indicating oscillations. In an actual arrangement of the sort indicated in Figure 2 a single tube, type 1D8GT, was used in which both a triode structure 10 and a pentode structure 22 are enclosed in a single bulb. In practice, it was found that relaxation oscillations were obtainable with a voltage of 45 volts at battery 16; a voltage of 1½ volts, or even considerably less, at battery 19; 50,000 ohms, more or less, within wide limits at resistor 17; and almost any resistance up to several hundred thousand ohms at 33. The photocell employed at 36 was type 919. With light falling on the cell relaxation oscillations were observed as a series of ticks in the phones 34. The frequency of these ticks was found to be substantially proportional to the amount of light admitted to the photocell. In total darkness, however, with condenser 35 adjusted to about 25 micromicrofarads and with surface leakage over the glass envelopes of the tubes reduced to a minimum by careful washing, the ticks could be made as infrequent as about two per minute. In this condition the light of a candle several hundred feet away changes the rate of ticking measurably.

For the measurement of light the photocell 36 is enclosed in a box into which light is admitted through a hole in the cover indicated at 39. In order to control the amount of light admitted a calibrated optical wedge 40 or adjustable diaphragm is employed. The wedge or diaphragm is adjusted to produce a suitable rate of ticking and the light intensity is then indicated by the frequency of the ticks together with the diaphragm setting. The system may be calibrated by a single measurement of a light of known intensity. It would, of course, be possible, instead of counting ticks, to amplify and rectify the ticks and observe the rectified current which would be proportional to the frequency of the ticks. If the arrangement of Figure 2 is employed solely as a relaxation oscillator the photocell 36 may be replaced by a high resistance and phones 34 may be omitted unless an audible indication of oscillations is desired.

For practical purposes, the sensitivity of the device of Figure 2 is limited, especially in the presence of high atmospheric humidity, by leakage over the glass envelopes of the photocell and the vacuum tube, as well as across the insulation of condenser 35. When the arrangement is used for photographic measurements in a dark room it is also important to prevent such leakage from occurring as a result of the breath of the operator.

Figure 4 shows how the photocell elements and the coupling condenser and the grid 12 may be placed within a single evacuated vessel whereby the aforesaid leakage paths are confined within the vacuum and, hence, not subject to atmospheric humidity. In Figure 4 element 37 is the photocell cathode and element 48 the photocell anode. No further description of Figure 4 is thought necessary, except to note that the filaments of the two tube sections are shown arranged in series instead of in parallel so as to reduce the filament current requirements with a view to adapting the arrangement to operation from an alternating current source.

Figure 5 shows a power supply circuit adapted to be energized from an alternating current source and to provide rectified current for heating the filaments of the arrangement of Figure 4, as well as rectified plate potential therefor. In Figure 5 tube 50 is a rectifier tube energized both as to its cathode 53 and as to its space current path from a source marked 110v. Rectified current from tube 50 is filtered in the usual filter 54 and output anode potential supply is derived from the output of said filter. A resistor 55 is employed to limit the current output at terminals marked −3b and +3b to the value required for heating the filament of tube 41 of Figure 4. The anode voltage output terminal marked +45b may be connected at an intermediate point along resistor 55 so as to obtain any desired amount of anode voltage. The arrangement of Figure 5 is thus adapted to be substituted for filament and anode batteries for energizing the arrangement of Figure 4.

Figure 6 represents a further modification of Figure 4 wherein separate evacuated envelopes are used for enclosing the elements of the triode tube 10 and the photocell and capacity elements 48, 37, 65. In this case, elements 37 and 48 again represent the cathode and anode of the photocell while the capacity between disc 65 and cathode 37 functions as condenser 35 of Figure 4. By this construction as economy of parts is obtained and the techniques of evacuation of the amplifier portion 10 and the photoelectric cell portion are maintained separate.

While I have shown and particularly described several embodiments of my invention, it is to be distinctly understood that my invention is not limited thereto but that modifications within the scope of my invention may be used.

I claim:

1. A negative transconductance system comprising a first stage and a second stage of electron discharge devices each having a grid-to-cathode circuit and a cathode-to-anode circuit, a load resistor and a single source of anode voltage common to said cathode-to-anode circuits, an additional load in the cathode-to-anode circuit of the second stage, control means connected to the grid of the first stage, and a direct connection from the grid of the second stage to the junction between said resistor and said source.

2. A negative transconductance system as defined in claim 1 wherein the cathodes of said discharge devices are directly connected together and heated from a single source.

3. A photoelectric measuring circuit comprising a negative transconductance system as defined in claim 1 with the addition at a photoelectric cell connected in said input circuit, a condenser connected between said input and output circuits, and a resistance, and means for indicating oscillations connected in said output circuit.

4. In combination, a system including a first electron discharge device, a photoelectric discharge device, a condenser, said electron discharge device including a hot cathode, a grid, and an anode, said photoelectric device including a photo-emissive cathode and a cooperating anode, said grid, photocathode and one electrode of said condenser being connected directly together to form a single conducting system, the anode of said photoelectric device being connected to said hot cathode, a second electron discharge device having a cathode directly connected to the cathode of the first electron discharge device, an anode connected to the condenser electrode other than that which is connected to said photocathode, and a control grid connected to a cathode resistor common to the two said discharge devices; and a responsive device and a direct current source in circuit between the anode of said second electron discharge device and said cathode resistor.

5. A negative transconductance system according to claim 1 wherein said control means includes a photoelectric element operative as a grid leak in the first stage, and the grid of said first stage is capacitively coupled to the anode of the second stage.

6. A direct current amplifier comprising two electron discharge devices constituted as first and second stages respectively; the first stage having a cathode, an anode, and a control grid; the second stage having a cathode, an anode, a control grid, and a screen grid; a cathode-to-anode circuit common to the two stages; said circuit including a resistor and a source of anode potential; an input circuit connected between the control grid and cathode of the first stage; a direct connection to the control grid of the second stage from the junction between said resistor and said source, a connection from the positive side of said source to said screen grid, an output load in circuit between said source and the anode of the second stage, and an electric heating source common to both cathodes.

7. In combination, a first stage means for amplifying a steady control potential; a light source and a photoelectric cell influenced thereby for determining the value of said steady control potential; a second stage amplifier including an electron discharge device having a cathode, an anode, a control grid and a screen grid; a cathode resistor, a direct current source, and an output load connected between said cathode and said anode; a direct connection to said control grid from the junction between said resistor and said source; a connection from said source to said screen grid; and capacitive means coupling said anode to a suitable point on said first stage amplifying means whereby oscillations are caused to be delivered to said load.

8. Apparatus for determining the translucence of a given medium comprising the combination set forth in claim 7 wherein said medium is interposed between said light source and said photoelectric cell; and a sound reproducer in said output load.

9. In apparatus for measuring light intensity in terms of the frequency of output impulses produced by said apparatus, the combination comprising a controlled electron discharge device, a photo-electric device constituted as a variable leak resistor in circuit between the cathode and control grid of said discharge device, a second discharge device constituted as a second stage in said apparatus, a cathode resistor common to the cathodes of the two said discharge devices, capacitive feed-back means connected between the anode of said second discharge device and the control grid of the discharge device first mentioned, an output circuit having a direct current operating source and said cathode resistor common to the two said discharge devices, a responsive device connected between said source and the anode of the second stage discharge device, and a control grid in said second stage discharge device connected to the junction between said cathode resistor and said source, said combination being effective to produce said output impulses in said responsive device at a frequency which is substantially proportional to the light intensity sensed by said photo-electric device.

WALTER van B. ROBERTS.